US012493662B2

(12) United States Patent
Miranda et al.

(10) Patent No.: US 12,493,662 B2
(45) Date of Patent: *Dec. 9, 2025

(54) DISSIMILAR BUT RELEVANT SEARCH ENGINE RESULTS (71) Applicant: eBay Inc., San Jose, CA (US)

(72) Inventors: Daniel David Miranda, San Jose, CA (US); Amit Jaiswal, San Jose, CA (US); David Goldberg, Palo Alto, CA (US)

(73) Assignee: eBay Inc., San Jose, CA (US)

(*) Notice: Subject to any disclaimer, the term of this patent is extended or adjusted under 35 U.S.C. 154(b) by 666 days.

This patent is subject to a terminal disclaimer.

(21) Appl. No.: 17/323,261

(22) Filed: May 18, 2021

(65) Prior Publication Data
US 2021/0271723 A1    Sep. 2, 2021

Related U.S. Application Data (63) Continuation of application No. 15/585,967, filed on May 3, 2017, now Pat. No. 11,042,595.
(Continued)

(51) Int. Cl.
G06F 16/00     (2019.01)
G06F 16/2457   (2019.01)
(Continued)

(52) U.S. Cl.
CPC .... G06F 16/9535 (2019.01); G06F 16/24578 (2019.01); G06F 16/287 (2019.01);
(Continued)

(58) Field of Classification Search
CPC ............ G06F 16/9535; G06F 16/9532; G06F 16/287; G06F 16/838; G06F 16/24578;
(Continued)

(56) References Cited

U.S. PATENT DOCUMENTS 6,385,602 B1    5/2002  Tso et al.
6,697,799 B1    2/2004  Neal et al.
(Continued)

FOREIGN PATENT DOCUMENTS

CA        2644440 A1 *  9/2007
WO    WO2008085637 A2 *  7/2008
(Continued)

OTHER PUBLICATIONS

Rahul Agrawal et al., "Rank Fusion of Results from Multiple Search Engines: An Implementation", 2013 International Conference on Machine Intelligence and Research Advancement, Dec. 2013, pp. 224-229.*
(Continued)

Primary Examiner — Srirama Channavajjala
(74) Attorney, Agent, or Firm — Shook Hardy & Bacon L.L.P.

(57) ABSTRACT

A search engine is configured to return search results with increased diversity among the search results. When a query is received from a client device, items are identified as search results for the query and grouped into categories. The categories are also grouped into classes. A user interface is generated with items grouped together by category and categories grouped together by class. The user interface is returned to the client device as a response to the query.

20 Claims, 8 Drawing Sheets

Related U.S. Application Data (60) Provisional application No. 62/331,547, filed on May 4, 2016.

(51) Int. Cl.
| | |
|---|---|
| *G06F 16/28* | (2019.01) |
| *G06F 16/838* | (2019.01) |
| *G06F 16/903* | (2019.01) |
| *G06F 16/9532* | (2019.01) |
| *G06F 16/9535* | (2019.01) |
| *H04L 67/025* | (2022.01) |
| *H04L 67/306* | (2022.01) |
| *H04L 67/50* | (2022.01) |

(52) U.S. Cl.
CPC ...... *G06F 16/838* (2019.01); *G06F 16/90348* (2019.01); *G06F 16/9532* (2019.01); *H04L 67/025* (2013.01); *H04L 67/306* (2013.01); *H04L 67/535* (2022.05)

(58) Field of Classification Search
CPC ............. G06F 16/90348; H04L 67/535; H04L 67/025; H04L 67/306
See application file for complete search history.

(56) References Cited

U.S. PATENT DOCUMENTS

| | | | |
|---|---|---|---|
| 7,302,429 | B1 | 11/2007 | Wanker |
| 8,145,618 | B1 | 3/2012 | Pfleger et al. |
| 8,566,331 | B1 | 10/2013 | Covell et al. |
| 8,589,429 | B1 | 11/2013 | Thirumalai et al. |
| 8,787,679 | B1 | 7/2014 | Ramesh et al. |
| 8,843,478 | B1 | 9/2014 | Jing et al. |
| 9,218,392 | B1 | 12/2015 | Zgraggen et al. |
| 9,245,026 | B1 | 1/2016 | Hoover et al. |
| 9,977,951 | B2 * | 5/2018 | Jiang ..................... G06V 20/30 |
| 10,142,279 | B2 * | 11/2018 | Ye ........................... H04L 51/52 |
| 10,853,397 | B2 * | 12/2020 | Lisa ....................... G06F 16/338 |
| 11,042,595 | B2 | 6/2021 | Miranda et al. |
| 11,216,833 | B2 * | 1/2022 | Choe ..................... G06F 3/0482 |
| 2003/0195877 | A1 | 10/2003 | Ford et al. |
| 2008/0033939 | A1 | 2/2008 | Khandelwal |
| 2009/0024577 | A1 * | 1/2009 | Prestel .................... G06F 16/58 |
| 2011/0040749 | A1 | 2/2011 | Ceri et al. |
| 2011/0258032 | A1 * | 10/2011 | Vadlamani ......... G06Q 30/0243 707/765 |
| 2012/0233178 | A1 * | 9/2012 | Oztekin ................ G06F 16/353 707/E17.014 |
| 2013/0091131 | A1 * | 4/2013 | Szymanski ........... G06F 16/353 707/E17.014 |
| 2013/0179420 | A1 * | 7/2013 | Park ...................... G06F 16/9535 707/706 |
| 2013/0212110 | A1 * | 8/2013 | Stankiewicz ......... G06F 16/355 707/E17.046 |
| 2014/0040271 | A1 * | 2/2014 | Thuler .................. G06F 16/951 707/740 |
| 2014/0172846 | A1 * | 6/2014 | Jones .................... G06F 16/951 707/728 |
| 2015/0088859 | A1 * | 3/2015 | Weissl ................ G06F 16/9535 707/E17.014 |
| 2015/0161176 | A1 | 6/2015 | Majkowska et al. |
| 2015/0169573 | A1 | 6/2015 | Arora et al. |
| 2015/0347417 | A1 | 12/2015 | Hohwald et al. |
| 2015/0379571 | A1 * | 12/2015 | Grbovic ............. G06Q 30/0256 705/14.54 |
| 2017/0323022 | A1 | 11/2017 | Miranda et al. |

FOREIGN PATENT DOCUMENTS

| | | | |
|---|---|---|---|
| WO | WO2008100849 | A2 * | 8/2008 |
| WO | WO2009046435 | A1 * | 4/2009 |
| WO | WO2013103565 | A1 * | 7/2013 |
| WO | WO2013160720 | A1 * | 10/2013 |

OTHER PUBLICATIONS

Lingxi Xie et al., "Image Classification and Retrieval are ONE", ICMR '15: Proceedings of the 5th ACM on International Conference on Multimedia Retrieval Jun. 2015, pp. 3-10.*
Final Office Action Received for U.S. Appl. No. 15/585,967, mailed on Apr. 16, 2020, 17 pages.
Final Office Action received for U.S. Appl. No. 15/585,967, mailed on Oct. 7, 2019, 14 pages.
First Action Interview Pre-Interview Communication received for U.S. Appl. No. 15/585,967, mailed on Jun. 17, 2019, 4 pages.
First Action Interview-Office Action Summary received for U.S. Appl. No. 15/585,967, mailed on Jul. 29, 2019, 3 pages.
Non Final Office Action Received for U.S. Appl. No. 15/585,967, mailed on Jan. 2, 2020, 17 Pages.
Non Final Office Action Received for U.S. Appl. No. 15/585,967, mailed on Oct. 19, 2020, 18 pages.
Notice of Allowance Received for U.S. Appl. No. 15/585,967, mailed on Mar. 10, 2021, 7 pages.
Decision on Pre Appeal Brief for U.S. Appl. No. 15/585,967, mailed on Jul. 7, 2020, 2 pages.

* cited by examiner

DISSIMILAR BUT RELEVANT SEARCH ENGINE RESULTS

CROSS-REFERENCE TO RELATED APPLICATIONS

This patent application is a continuation of U.S. patent application Ser. No. 15/585,967, filed May 3, 2017, which claims priority to U.S. Provisional Patent Application No. 62/331,547, filed May 4, 2016. Each of the aforementioned applications is incorporated herein by reference in its entirety.

TECHNICAL FIELD

Embodiments of the present disclosure relate generally to search engines and, more particularly, but not by way of limitation, to a search engine configured to return dissimilar but relevant search results.

BACKGROUND

An Internet-centric problem when searching online using search engines is lack of diversity in search results. Often, many of the search engine returned results are nearly identical to one another. These redundant results can decrease the usefulness of some types of search engines.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

The present disclosure seeks to provide technical solutions to the above mentioned problems by employing a diversity search engine to return results that are different from one another (e.g., have different attributes, have different categorization) but are still relevant to a given query. The diversity search engine seeks to leverage the structure of a database for items published to a listing website. It is appreciated that there are different types of search engines. Some conventional search engines rely heavily on keyword matching query terms to terms found in the results. These conventional search engines may leave out results that users frequently navigate to when browsing through query results. Thus, the sought after (e.g., navigated to) results are left buried in second and third webpages of search results and in fact may never even be retrieved from the database.

According to some example approaches, the diversity search engine receives a search request indication from the client device and accesses session data that relates to one or more historical user sessions. The diversity search engine detects items having item pages that were accessed during one or more user sessions after submission of the search query in the one or more user sessions. The diversity search engine further detects item categories that contain items having pages accessed during the one or more user sessions after the submission of the search query. The diversity search engine can further rank the items or the item categories based on a score determined by the user sessions that show a client device navigated to the item (e.g., webpage displaying data about the item) after submitting the search query. The ranking may be based on various factors including an average time between the submission of the search query and navigation to an item page or to an item category, filtering of the search query after submission of the search query but before navigation to the item page or the item category, or a purchase of an item between submission of the search query and navigation to the item or the item category. The diversity search engine can further cause a presentation on the client device that displays a selection of items and a selection of item categories based on the ranking of the items in the item categories. The diversity search engine can further generate the display of items and item categories in order to present a diverse group of items or item categories in order to present less homogenous results on the client device.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"COMPONENT" in this context refers to a device, physical entity, or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-STORAGE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-storage medium" should be taken to include a single medium or multiple media (e.g., a centralized or distributed database, or associated caches and servers) able to store instructions. The term "machine-storage medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-storage medium" refers to a single storage apparatus or device, as well as "cloud-based" storage systems or storage networks that include multiple storage apparatus or devices. The term "machine-storage medium" excludes signals per se.

"SIGNAL MEDIUM" The term "signal medium" or "transmission medium" shall be taken to include any form of modulated data signal, carrier wave, and so forth. The term "modulated data signal" means a signal that has one or more of its characteristics set or changed in such a matter as to encode information in the signal.

"COMPUTER READABLE MEDIUM The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions may further be transmitted or received over a communications network 626 using a transmission medium via the network interface device and utilizing any one of a number of well-known transfer protocols (e.g., HTTP). Examples of communication networks include a local area network (LAN), a wide area network (WAN), the Internet, mobile telephone networks, plain old telephone service (POTS) networks, and wireless data networks (e.g., WiFi, LTE, and WiMAX networks). The term "transmission medium" or "signal medium" shall be taken to include any intangible medium that is capable of storing, encoding, or carrying instructions for execution by the machine, and includes digital or analog communications signals or other intangible medium to facilitate communication of such software.

"PROCESSOR" in this context refers to any circuit or virtual circuit (a physical circuit emulated by logic executing on an actual processor) that manipulates data values according to control signals (e.g., "commands," "op codes," "machine code,") and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

DESCRIPTION

The description that follows includes systems, methods, techniques, instruction sequences, and computing machine program items that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1:
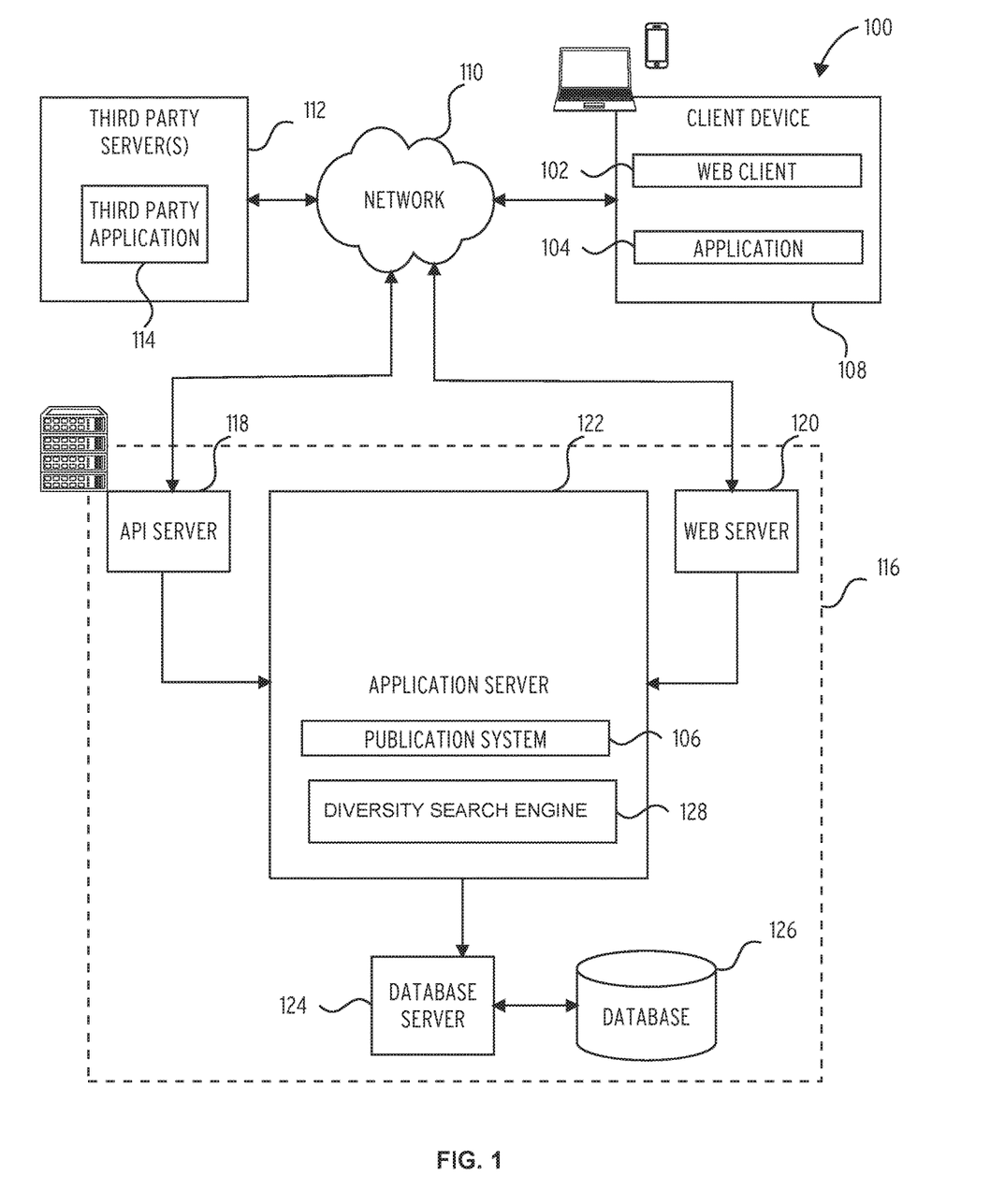
FIG. 1 is a block diagram illustrating a networked system implementing a diversity search engine, according to some example embodiments.

With reference to FIG. 1, an example embodiment of a high-level SaaS network architecture 100 is shown. A networked system 116 provides server-side functionality via a network 110 (e.g., the Internet or wide area network (WAN)) to a client device 108. A web client 102 and a programmatic client, in the example form of an application 104 are hosted and execute on the client device 108. The networked system 116 includes an application server 122, which in turn hosts a publication system 106 that provides a number of functions and services to the application 104 that accesses the networked system 116.

The client device 108 enables a user to access and interact with the networked system 116. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An Application Program Interface (API) server 118 and a web server 120 are coupled to, and provide programmatic and web interfaces respectively, to the application server 122. The application server 122 hosts the publication system 106 which allows the publication of items on the application server 122, and a diversity search engine 128, which includes components described herein. The diversity search engine 128 is configured to receive a query and return search results that are dissimilar to one another (e.g., categorically diverse, diverse attributes, diverse features), yet still relevant to the query according to past historical user data. Further details of the diversity search engine 128 are discussed below with reference to FIG. 2. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third party application 114, executing on a third party server 112, is shown as having programmatic access to the networked system 116 via the programmatic interface provided by the Application Program Interface (API) server 118. For example, the third party application 114, using information retrieved from the networked system 116, may support one or more features or functions on a website hosted by the third party.

Turning now specifically to the applications hosted by the client device 108, the web client 102 may access the various systems (e.g., publication system 106) via the web interface supported by the web server 120. Similarly, the application 104 (e.g., an "app") accesses the various services and functions provided by the publication system 106 via the programmatic interface provided by the Application Program Interface (API) server 118. The application 104 may, for example, be an "app" executing on the client device 108, such as an iOS or Android OS application to enable user to access and input data on the networked system 116 in an off-line manner, and to perform batch-mode communications between the application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publication system 106 could also be implemented as a standalone software program, which do not necessarily have networking capabilities.

Figure 2:
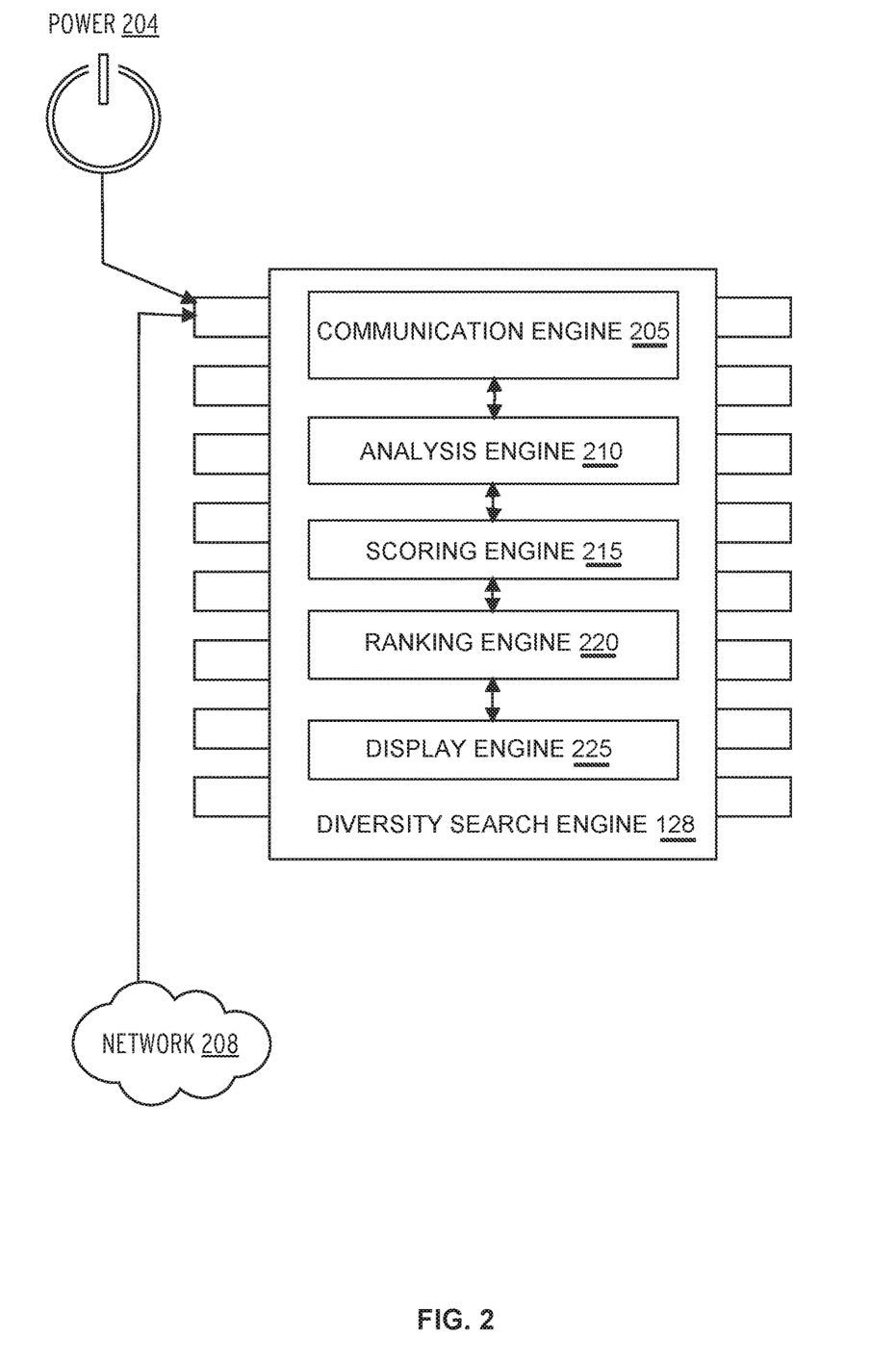
FIG. 2 is a block diagram showing the architectural details of a diversity search engine, according to some example embodiments.

FIG. 2 is a block diagram showing the architectural details of the diversity search engine 128, according to some example embodiments. The diversity search engine 128 may be activated on a physical computer (e.g., server) activated by a power button 204, according to some example embodiments. As illustrated, the diversity search engine 128 is includes a communication engine 205 by which the diversity search engine 128 communicates (e.g., over the network 110) with other systems within the SaaS network architecture 100. Additionally shown are an analysis engine 210, scoring engine 215, ranking engine 220, and display engine 225, which are all communicatively coupled to communication engine 205 within the diversity search engine 128.

The communication engine 205 operates to receive information from the client device 108 or access information from the database 126 via the database server 124. For example, the communication engine 205 may receive a search query from the client device 108 and, responsive to receiving the search query, accesses a plurality of items and item categories contained within the database 126.

The analysis engine 210 operates to determine whether session data from a plurality of user sessions includes, within the metadata of the session data, an indicator that a user session includes a submission of a search query by a past client device. The scoring engine 215 operates to determine transition scores for items and categories based on browse patterns of past users for a given query, according to some example embodiments. The ranking engine 220 operates to rank items or item categories according to the transition score assigned by the scoring engine 215. The display engine 225 is operable to select items or item categories based on the ranking by the ranking engine 220. The display engine 225 also creates a display (e.g., code comprising descriptive text, markup language, and links to images) of items and item categories for transmission to the client device 108 and presentation on a user interface on the client device 108.

Figure 3:
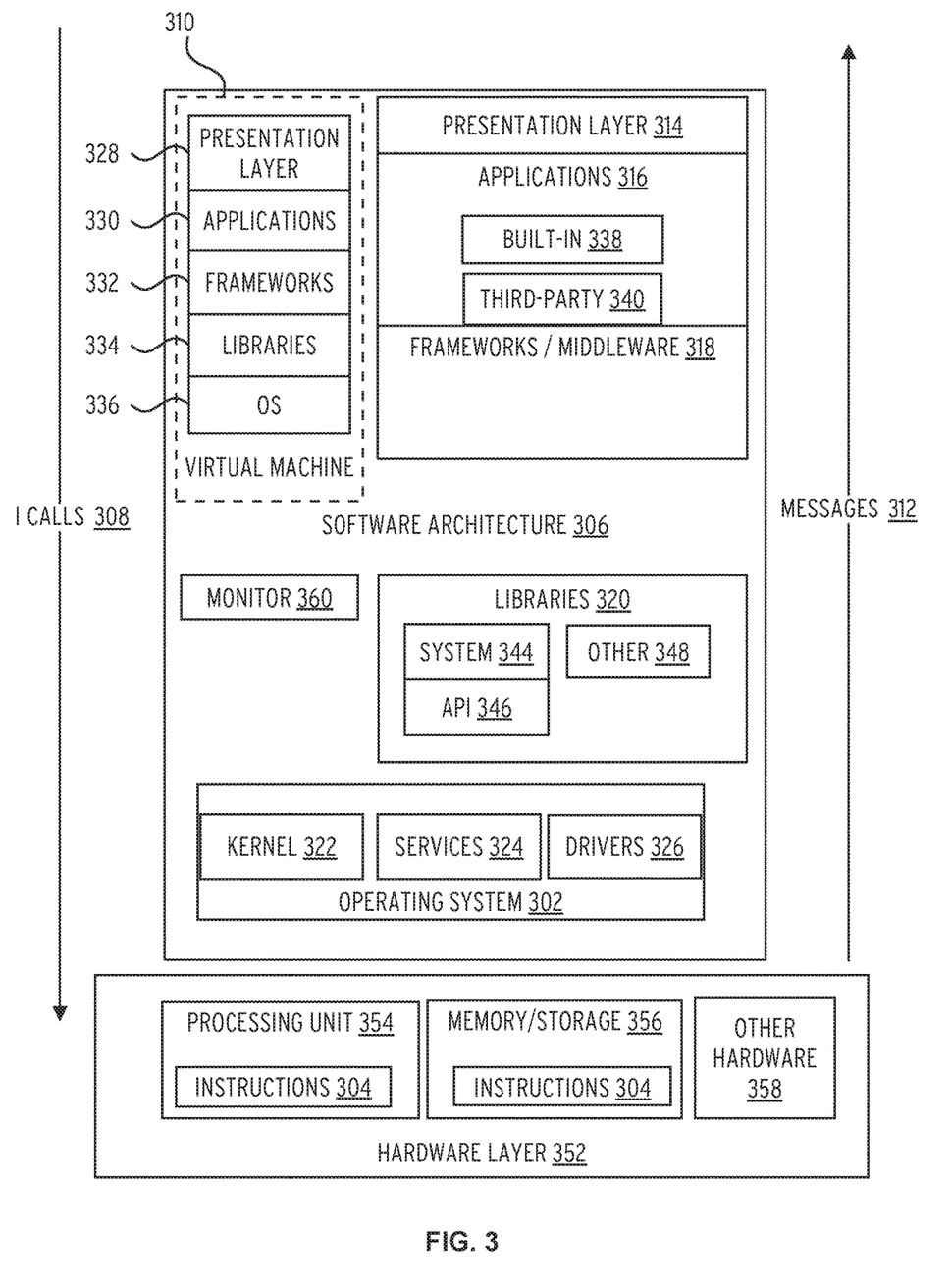
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture and it will be appreciated that many other architectures may be implemented to facilitate the functionality described herein. The software architecture 306 may execute on hardware such as machine 400 of FIG. 4 that includes, among other things, processors 404, memory 414, and I/O components 418. A representative hardware layer 352 is illustrated and can represent, for example, the machine 400 of FIG. 4. The representative hardware layer 352 includes a processing unit 354 having associated executable instructions 304. The executable instructions 304 represent the executable instructions of the software architecture 306, including implementation of the methods, components, and so forth described herein. The hardware layer 352 also includes memory and/or storage modules memory/storage 356, which also have executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, applications 316 and a presentation layer 314. Operationally, the applications 316 and/or other components within the layers may invoke application programming interface (API) API calls 308 through the software stack and receive a response as in response to the API calls 308. The layers illustrated are representative in nature and not all software architectures have all layers. For example, some mobile or special purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324 and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than to interface directly with the underlying operating system 302 functionality (e.g., kernel 322, services 324, and/or drivers 326). The libraries 320 may include system libraries 344 (e.g., C standard library) that provide functions such as memory allocation functions, string manipulation functions, mathematical functions, and the like. In addition, the libraries 320 may include API libraries 346 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks frameworks/middleware 318 (also sometimes referred to as "middleware") provides a higher-level common infrastructure that may be used by the applications 316 and/or other software components/modules. For example, the frameworks/middleware 318 may provide various graphic user interface (GUI) functions, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. Third-party applications 340 may include any an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 340 may invoke the API calls 308 provided by the mobile operating system (such as operating system 302) to facilitate functionality described herein.

The applications 316 may use built in operating system functions (e.g., kernel 322, services 324, and/or drivers 326), libraries 320, and frameworks/middleware 318 to create user interfaces to interact with users of the system. Alternatively, or additionally, in some systems interactions with a user may occur through a presentation layer, such as presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (operating system (OS) 336 in FIG. 3) and typically, although not always, has a virtual machine monitor 360, which manages the operation of the virtual machine as well as the interface with the host operating system (i.e., operating system 302). A software architecture executes within the virtual machine 310 such as an operating system operating system (OS) 336, libraries 334, frameworks 332, applications 330 and/or presentation layer 328. These layers of software architecture executing within the virtual machine 310 can be the same as corresponding layers previously described or may be different.

Figure 4:
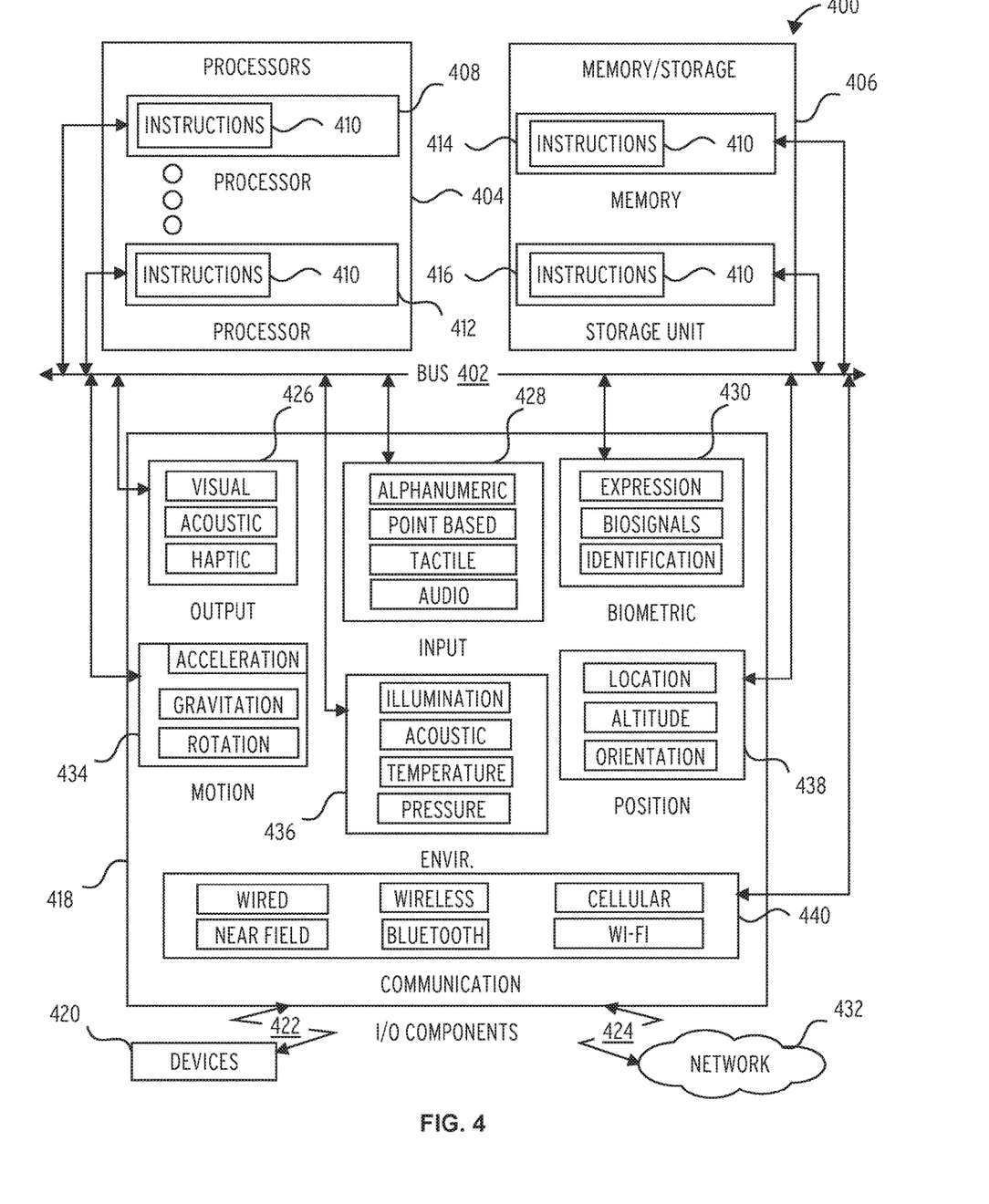
FIG. 4 is a block diagram illustrating components of a machine, according to some example embodiments, able to read instructions from a machine-storage medium (e.g., a machine-readable storage medium) and perform any one or more of the methodologies discussed herein.

FIG. 4 is a block diagram illustrating components of a machine 400, according to some example embodiments, able to read instructions from a machine-storage medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine into a particular machine programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 comprising cores 408 and 412, memory memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion and the grouping is in no way limiting. In various example embodiments, the I/O components 418 may include output components 426 and input components 428. The output components 426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environmental environment components 436, or position components 438 among a wide array of other components. For example, the biometric components 430 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 438 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via coupling 422 and coupling 424 respectively. For example, the communication components 440 may include a network interface component or other suitable device to interface with the network 432. In further examples, communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a Universal Serial Bus (USB)).

Moreover, the communication components 440 may detect identifiers or include components operable to detect identifiers. For example, the communication components processors communication components 440 may include Radio Frequency Identification (RFID) tag reader components, NFC smart tag detection components, optical reader components (e.g., an optical sensor to detect one-dimensional bar codes such as Universal Item Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as, location via Internet Protocol (IP) geo-location, location via Wi-Fi® signal triangulation, location via detecting a NFC beacon signal that may indicate a particular location, and so forth.

Figure 5:
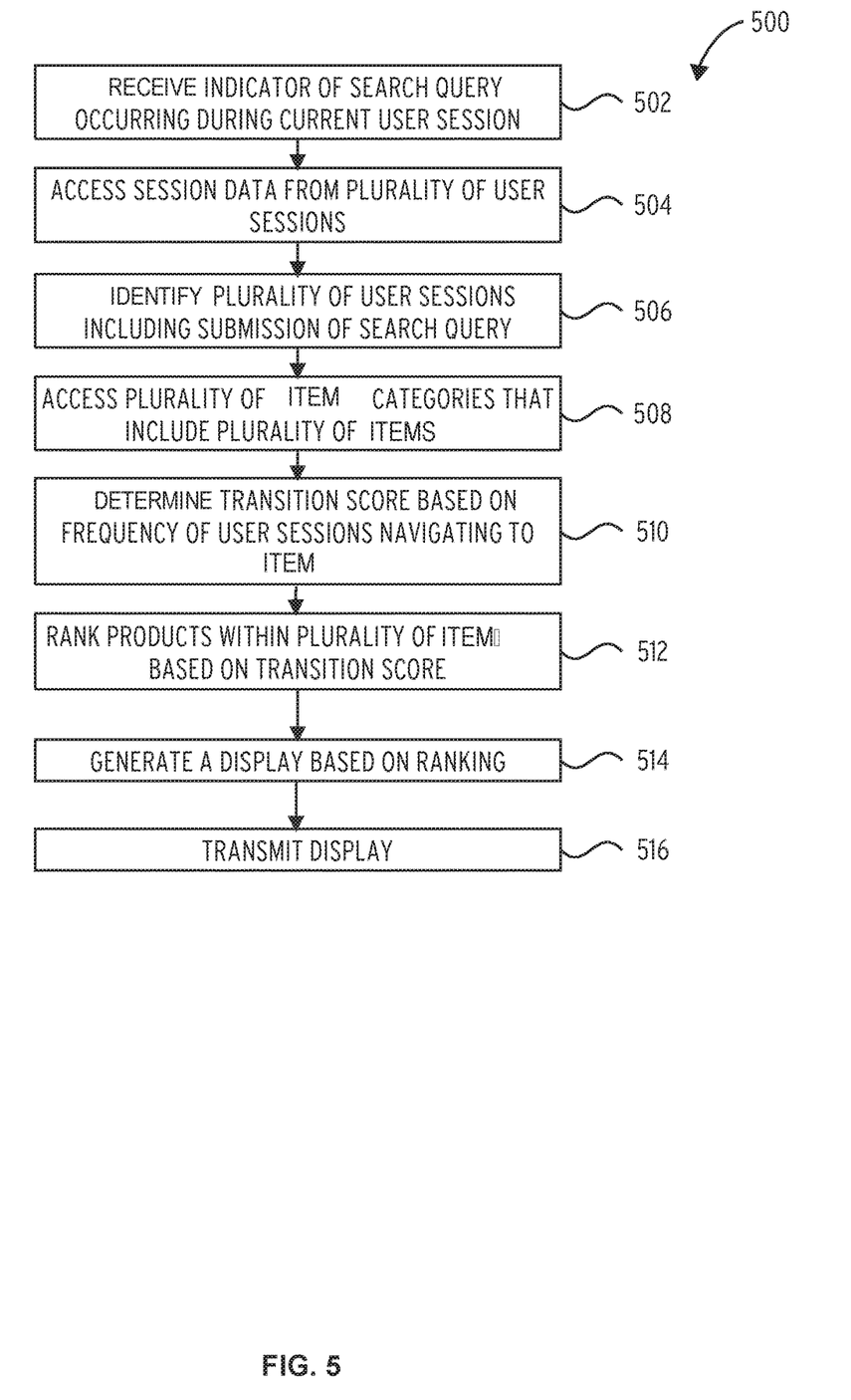
FIG. 5 illustrates a flow diagram of a method for generating item rankings, according to some example embodiments.

FIG. 5 shows a flow diagram of a method 500 for generating dissimilar but relevant search results for a particular category, according to some example embodiments. At operation 502, the communication engine 205 receives an indicator that a search query has been submitted during the current user session. The indicator may comprise a request from the client device 108 that is submitted over the network 110 and received by the application server 122. A search query may include a string of text, an image, or other content that is submitted to generate search results.

At operation 504, responsive to receiving the indicator (e.g., the query), the communication engine 205 accesses session data generated from a plurality of user sessions. The session data may be located at the database 126, and the communication engine 205 accesses the session data over the database server 124 using a search scheme such as Apache Lucene®. The session data includes a plurality of user sessions, each user session representing historical browse data of a past client device interacting with the application server 122 over the network 110 using the application 104. For example, a past user may have submitted a query with the text "smartwatch." After the results were returned, the user may have viewed the results and navigated to a listing page for a smartwatch case. The interactions of submitting the smartwatch query, viewing or scrolling through the results, and selecting a smartwatch case listing can be stored as session data for that past user. In some example embodiments, the session data is from other users that have a currently active session or recently terminated session (e.g., last hour, last day). In this way, the historical data being processed can be used to find recent trends in search result navigation. In other example embodiments, the session data is from all users that use the website over the past year. In this way, through using longer or older historical session data, more consistent trends in search result navigation can be used for score calculation, which discussed in further detail below.

At operation 506, the analysis engine 210 identifies a plurality of user sessions from the session data accessed by the communication engine 205. The analysis engine 210 identifies the plurality of user sessions by detecting which of the user sessions within the accessed session data has matching query data (e.g., matching or similar query strings). For instance, the communication engine 205 receives an indicator that a search query has been submitted to the application server 122 by the client device 108. The indicator could, for example, include the text of a textual query within the metadata of the indicator. For example, if there is a submission from the client device 108 of a query for string "Nike," the indicator received by the communication engine 205 includes the text "Nike" in the metadata of the indicator. Responsive to receiving the indicator the communication engine 205 accesses a plurality of user sessions containing session data. The analysis engine 210 then determines which user sessions from the accessed session data involved queries using the text "Nike." In some example embodiments, the analysis engine 210 implements string schemes (e.g., Levenshtein distance algorithm) to determine which user sessions correlate to queries having similar query terms.

At operation 508, the communication engine 205 accesses a plurality of item category datasets, each item category dataset comprising a plurality of items. For example, a shoe category dataset comprises item data for different shoes, and a smartwatch category dataset comprises item data for different smartwatches. The plurality of item category datasets and the items within these categories may be accessed by the communication engine 205 from the database 126 via the database server 124. The item categories may be designated based on aspects (e.g. brand, color, pattern, shape) or based on utility (e.g. capability, item specification). In some example embodiments, the categories may further include condition of the item, shipping location of the item, sale method (e.g. auction, close out), and other categories not listed herein. Each item within each of the categories includes an item page (e.g., a listing webpage, mobile app page) published via the publication system 106. The client device 108 can use the application 104 to cause the display of a user interface of images of the item, or take other action (e.g., submit an order for the item, bid on the item, bookmark the item).

At operation 510, the scoring engine 215 determines an transition score based on the quantity of user sessions within the plurality of user sessions that correspond to users navigating to a given item page. For example, the user sessions can include, within the metadata of the session data included in the user session, an indication that the client device 108 navigated to the item page associated with the item after submitting the search query. The scoring engine 215 then determines a transition score based on how many of the user sessions within the plurality of user sessions navigated to the given item page. For example, if 4,390 out of 62,026 user sessions within the plurality of user sessions navigate to the item page, the scoring engine 215 determines that the score for the item page is 7.07, based on the calculation that 7.07% of the previous user sessions navigated to the item page after inputting the search query. Thus, the scoring engine 215 assigns a score of between zero and 100 to every item page, according to some example embodiments. In some example embodiments, the item transition score is an integer representing the users that clicked on a certain item page. For example, if 4390 out of 62,026 user sessions clicked on a given item page, the 4390 integer is assigned to the item page as its item transition score.

Continuing with the previous example involving the "Nike," the communication engine 205 accesses the database 126 via the database server 124, the database 126 containing a plurality of items, each item having an item page. The scoring engine 215 then determines a score for each of the available item pages based on a quantity of user sessions that have browse data that indicate user's submitted the query "Nike" and subsequently navigated to the item page using the application 104.

At operation 512, the ranking engine 220 ranks items within the plurality of items based on the transition score determined by the scoring engine 215 in operation 510. Thus, the items within the plurality are ordered by the ranking engine 220 starting with the item that past client devices have historically most frequently navigated to after submitting the query containing a given query term.

At operation 514, the display engine 225, generates a display based on the ranking of the items within the plurality, the display being presentable on a user interface on the client device 108. According to some example embodiments, the display engine 225 selects a top segment of the items within the plurality, the top segment being a number of items that is ordered first by the ranking engine 220. The display may include a presentation of images representing each of the top segment of the items.

At operation 516, the display engine 225 transmits the display (e.g., markup language comprising item listing and image data) over the network 110 to the application 104 on the client device 108. The display may then be viewable on a user interface on the client device 108.

Continuing the above example with the "Nike" query, the ranking engine 220 orders the items within the plurality according to the transition score determined by the scoring engine 215. The display engine 225 selects the top 20 items with the highest transition scores and generates a display including images of these top 20 items. Finally, the display engine 225 transmits the display to the client device 108 over the network 110. The display is then rendered and made viewable on the client device 108 (e.g., on a user interface).

Figure 6:
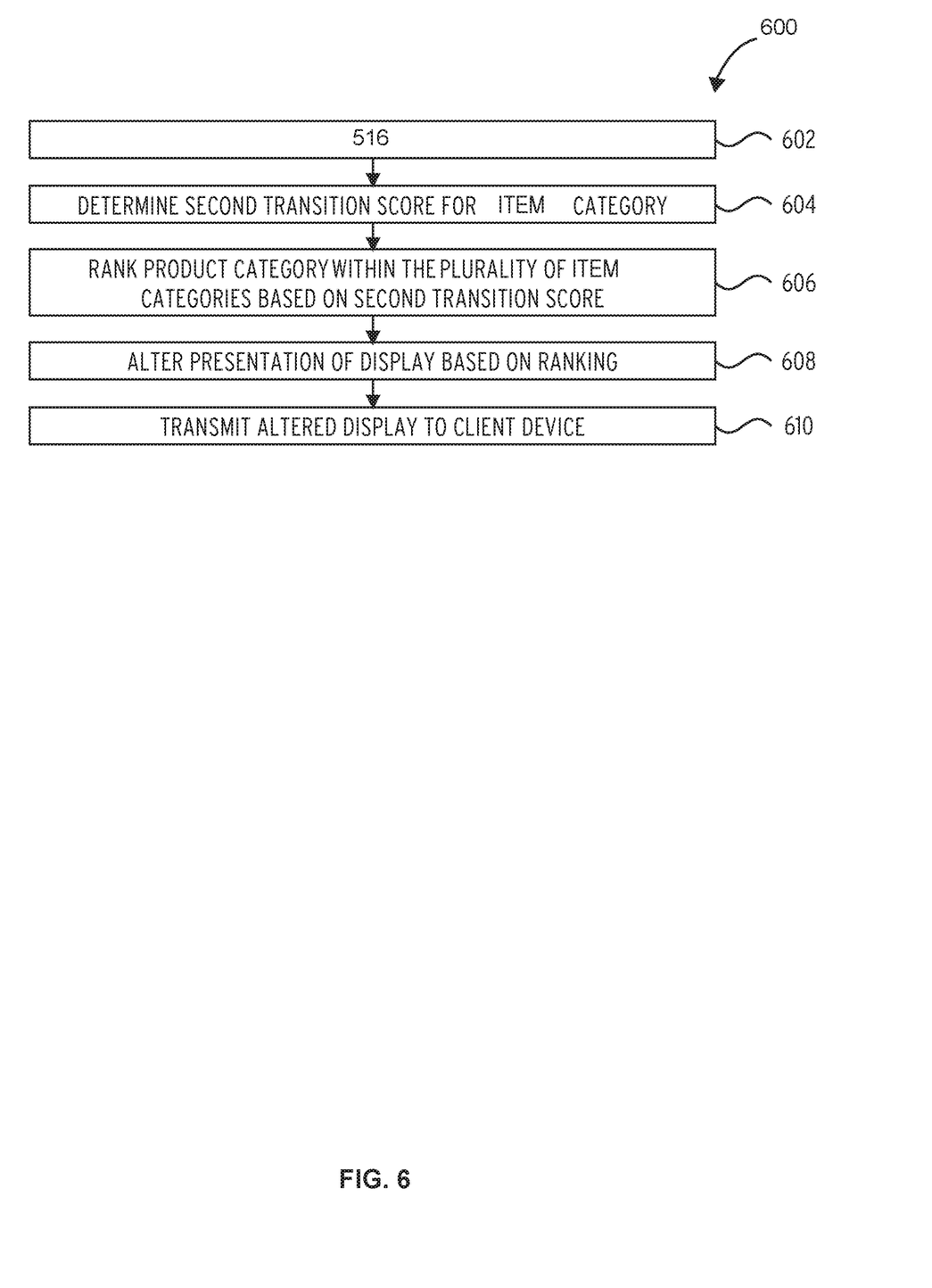
FIG. 6 illustrates a flow diagram of a method for altering rankings based at least in part on item category ranks, according to some example embodiments.

FIG. 6 illustrates a flow diagram of a method 600 for improved diversity search results based at least in part on categorical rankings, according to some example embodiments. As illustrated, the method 600 can be performed after the method 500. As such, operation 602 corresponds to operation 516, according to some example embodiments. At operation 604, the scoring engine 215 determines a category transition score for the item category based on the item transition scores of the plurality of items within the given category. For example, if a query "Nike" is received, the scoring engine 215 aggregates the item transition scores for a given category to generate a category transition score. In some example embodiments, the item transition scores of a given category are added together to generate the category transition score for that category. In some example embodiments, the item transitions scores of a given category are averaged to yield the category transition score for that given category.

At operation 606, the ranking engine 220 orders item categories against other item categories based on their respective category transition scores. At operation 608, the display engine 225 alters the presentation of the display based on the ranking of the categories. In an example embodiment, the display engine 225 may order an entire item category to be displayed before another item category. For example, for the query "Nike," the item category "men's running shoes" may be displayed higher in the search results than the category for "women's watches" based on the ranking of the categories.

At operation 610, the display engine 225 transmits the altered display over the network 110 to the client device 108 for display on the user interface by the application 104. Although the example described herein alters the display generated using method 500 in FIG. 5, one of ordinary skill in the art will appreciate that, according to some example embodiments, the items are ranked (e.g., operations 510 and 512 in FIG. 5) in each category, then the categories are ranked against each other (e.g., operations 604 and 606 in FIG. 6). Then, after the categories are ranked, and the items within each categories are ranked, a display is generated displaying the ranked categories, each of which comprises a plurality of ranked items.

Figure 7:
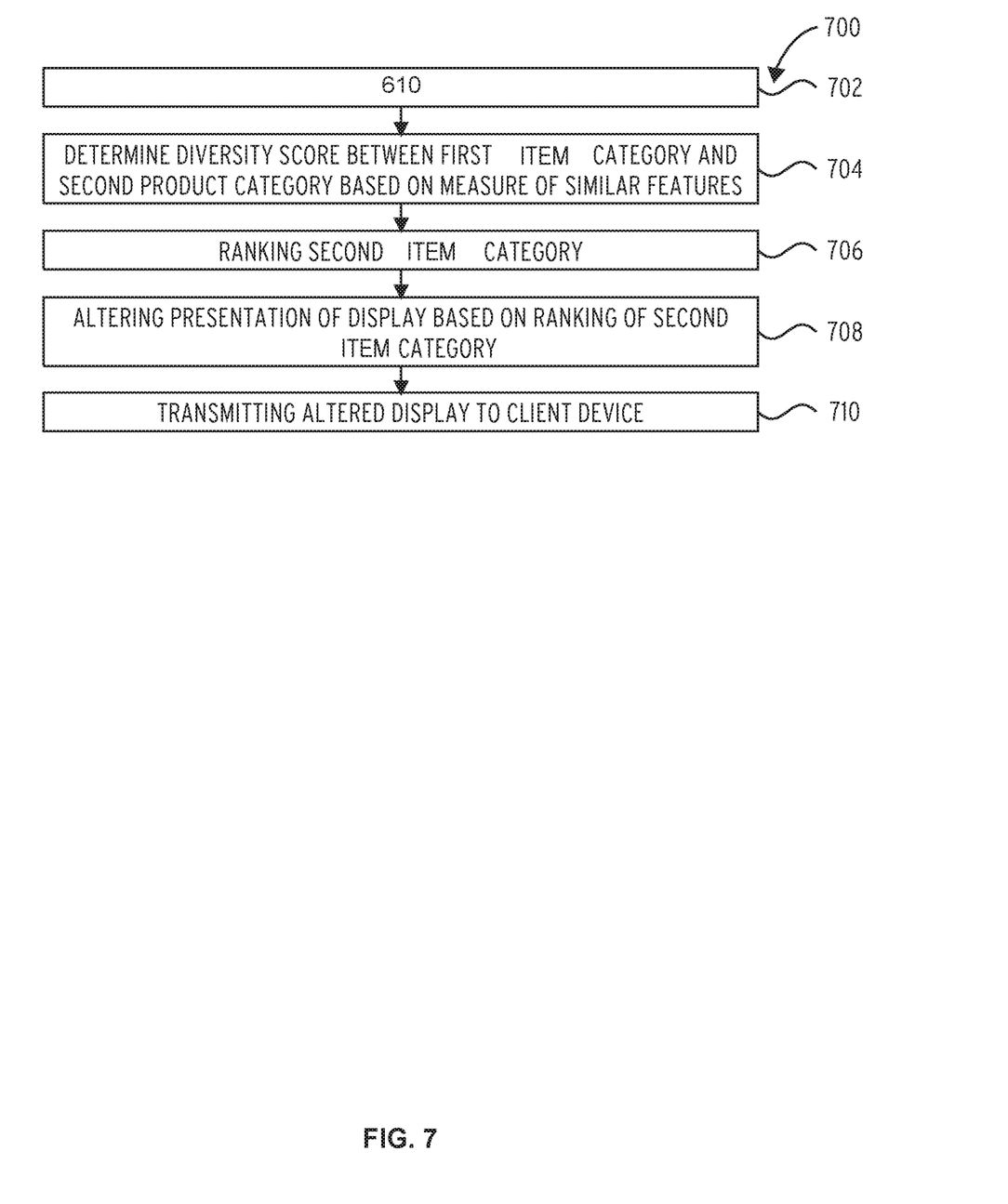
FIG. 7 illustrates a flow diagram of a method for altering rankings based at least in part on diversity information, according to some example embodiments.

FIG. 7 illustrates a flow diagram of a method 700 for improved diversity search results based at least in part on diversity rankings, according to some example embodiments. As illustrated, the method 700 can be performed after the method 600. As such, operation 702 corresponds to operation 610, according to some example embodiments. At operation 704, the scoring engine 215 determines a diversity score between a first item category and a second item category by determining similarities between the items in the respective categories. The first item category and second item category may be item categories that have already been selected for inclusion in the search results based on the operations of method 500 and 600, as described above.

Similar features for items include similar physical aspects (e.g. shape, color) of the items as well as similar purposes or functions. In some embodiments, the scoring engine 215 assigns a higher diversity score to the second item category based on the first item category and the second item category having few or no similar features between them. This may indicate that even though the second category contains potentially very different types of items than what was initially searched for, users nonetheless navigate to web pages of items in the second category. In this way, the browse habits of other users can improve the user experience (e.g., search result presentation) of a particular user. In some example embodiments, the scoring engine 215 implements a machine classifier (e.g., support vector machine, neural networks, decision trees, ensemble learning schemes) trained on database data to generate diversity scores for given categories. The database data can include all item and category data stored in the database 126 for use by the publication system 106.

As an example, the scoring engine 215 may determine that the item category "Men's Running Shoes" and the item category "Men's Apparel" have a diversity score of 45 between them. Conversely, the scoring engine 215 may determine that the item category "Men's Running Shoes" and the item category "Men's Cross-training Shoes" of the diversity score of 5 between them. The higher diversity score is due to the items in "Men's Apparel" having less shared features with the "Men's Running shoes" as compared to the items in "Men's Cross-training Shoes" and the items in "Men's Running shoes".

At operation 706, the ranking engine 220 ranks the second item category based on the diversity score assigned by the scoring engine 215. The ranking engine 220 can order the second item category, among other categories, according to the diversity score of the second item category. The ranking engine 220 further merges the category transition score for a given item category with the diversity score of the given category. For example, if a first item category is ranked lower than, but within 5 points of a second item category and has a higher diversity score with a third displayed category than the second item category, the ranking engine 220 may rank the first item category higher despite the lower transition score. Thus, the ranking engine 220 factors in diversity amongst item categories when ranking item categories.

At operation 708, the display engine 225 alters the display based on the ranking of the second item category. For example, if the merged ranking described above has been altered by the inclusion of the diversity score in the second item category and the ordering of item categories based on diversity score, the display engine 225 may select one or more new categories to display that are now ranked ahead of the previously displayed categories.

At operation 710, the display engine 225 transmits the altered display to the client device 108 over the network 110. The altered display is further presentable on the client device 108 on a user interface.

In some example embodiments, the diversity search engine 128 is configured to increase diversity by selecting the top N categories of the class that has the highest category transition score, then selecting the top N categories of the second most popular class of categories according to category transition scores.

The transition score and, by extension, the item transition score and the second transition score, may further be influenced by additional factors, according to some example embodiments. For example, the scoring engine 215 may raise or lower the first transition score, as it applies to the item, or the second transition score, as it applies to an item category, based on an average time it has taken for past client devices to navigate to an item or an item within the item category from the initial search query. For example, if past client devices on average take one minute to navigate to "Nike swoosh T-shirt" after searching for "Nike shoes," the scoring engine 215 may assign a higher item transition score to "Nike swoosh T-shirt" than if the past client devices have taken 30 minutes on average. Similarly, assuming the item "Nike swoosh T-shirt" is in the item category "Men's Apparel," the scoring component 212 may assign a similar category transition score to "Men's Apparel."

Similarly, the scoring engine 215 may base the item transition score or the category transition score on an average number of pages that past client devices navigate through (after inputting the search query) before navigating to a particular item or item category. Continuing the above example, the scoring engine 215 may assign a higher transition score to "Nike swoosh T-shirt" if past client devices had only navigated through an average of three item pages after submitting the query "Nike shoes" than the past client device having navigated through an average of 25 item pages.

Additionally, the scoring engine 215 may base the item transition score or the category transition score off whether the search query was filtered during the search and, if the search query was filtered, how many times it was filtered. This filtration information may be located within the session data of the past historical user sessions. For example, the scoring engine 215 may assign a higher item transition score to "Nike swoosh T-shirt" if past client devices had not typically input any other search query aside from "Nike shoes." Additionally, the scoring engine 215 may assign a higher item transition score for the past client devices having filtered "Nike shoes" to "Nike running shoes" rather than "Nike shoes" to "Nike men's apparel." Thus, the scoring engine 215 is able to prioritize items and item categories that are more particular to the original search query.

Finally, the scoring engine 215 may base the item transition score or the category transition score off whether a purchase event has occurred subsequent to the submission of the search query and the navigation of the past client devices to the item page or to the item category. For example, the scoring engine 215 may assign a lower item transition score if the user has purchased the item after using the search query but before navigating to the item that is being scored.

Figure 8:
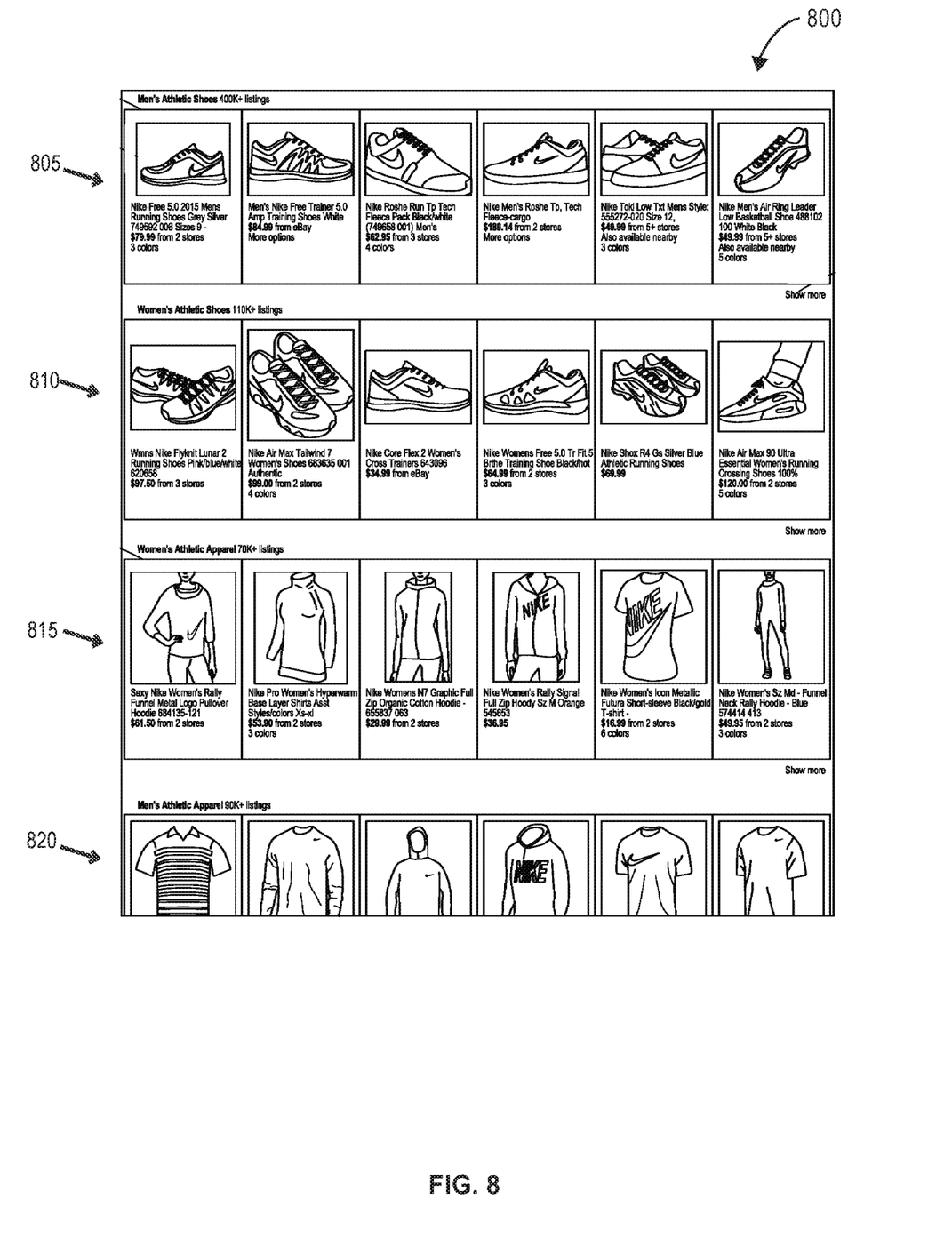
FIG. 8 is a user interface diagram that shows example results of the diversity search engine, according to some example embodiments.

FIG. 8 shows an example user interface 800 generated by the diversity search engine 128, according to some example embodiments. As illustrated, the search results can comprise a first item category 805, a second item category 810, a third item category 815, and a fourth item category 820, and so on. Each item category comprises items, each of which comprises an image thumbnail and descriptive text. Each of the items illustrated on the user interface 800 may link to a page (e.g., webpage) that displays the item in listing format. As discussed above, the listings can be published to the publication system 106 and stored in the database 126. As an illustrative example, assume a user through a client device submitted a query comprising the text "Nike". In response to the submitted query, the operations of FIG. 5 may return matching items (e.g., items that are Nike related, clothing, shoes, watches), and further generate a transition score for each of the items based on the historical data as discussed above. Thus, for example, the items in the first item category 805 (Men's Athletic Shoes) can be ordered as shown, from right to left, the right most item having the highest transition score.

In further response to the query, the operations of FIG. 6 may order entire categories according to the highest category transition scores, from top to bottom in the user interface 800, where the category with the highest transition score is placed at the top of the search results on the user interface 800.

In further response to the query, the operations of FIG. 7 may order the categories according to diversity scores. For example, assume that after the operations of FIG. 6, the third item category 815 and the fourth item category 820 have the same category transition scores. However, after the diversity determinations of the operations of FIG. 7, the third item category 815 has a higher overall score (e.g., merged score) and thus is placed higher than the fourth item category 820 in the search results. The higher diversity score of the third item category 815 (e.g., a category for women's clothing) may be with respect to the highest ranked item category, which is the first item category 805 (e.g., a category for men's shoes).

Further, as mentioned above, in some example embodiments, the diversity search engine 128 selects the most popular (according to category transition scores) N categories of class for the top portion of the search results, and the next most popular N categories for the next portion of the search results, and so forth. For example, with reference to FIG. 8, assume the scoring engine 215 determines that the first item category 805 has the highest category transition score according to historical user data. The first item category is of the shoe class of physical items tracked by database 126. Accordingly, if N is set to "2", then the first item category 805 is positioned at the top of the search results, and the next highest category of the shoe class (according to category transition score) is placed below the second item category 805. In the example shown in FIG. 8, of the categories in the shoe class, the next highest category is women's running shoes, thus second item category 810, which contains women's running shoes matching the query "Nike" are placed in the second position. In the example where N=2, after the first two categories are positioned, the scoring engine 215 then determines: of the categories, what is the next highest class excluding the already used class (e.g., the shoes class). Assume the next highest category according to category transition score is the apparel class. Accordingly, the scoring engine 215 selects the highest ranking category (according to category transition score) within that class, which is third item category 815, and places third item category 815 in the third position in the search results. Similarly, the next highest category (according to category transition score) within the apparel class is selected and placed. Thus, as illustrated, the fourth item category 820 is selected and placed as the fourth position. Other categories and items may similarly be placed below the fourth position on subsequent pages or in a scrollable area (not depicted) below the fourth position in FIG. 8.

The invention claimed is:

1. A computer system comprising:
one or more processors; and
one or more machine-storage media storing computer-useable instructions that cause the one or more processors to:
receive a query from a client device;
in response to receiving the query, generate a search results user interface for returning to the client device in response to the query by:
grouping a plurality of items identified as search results for the query into a plurality of categories, wherein each category comprises a subset of items sharing one or more attributes and each item from the plurality of items is placed in one of the plurality of categories,
grouping the plurality of categories for the plurality of items identified as search results for the query into a plurality of classes, wherein each class comprises a subset of categories sharing one or more attributes and each category from the plurality of categories is placed in one of the plurality of classes, and
generating the search results user interface displaying a plurality of item groupings, wherein each item grouping identifies a category from the plurality of categories and includes one or items grouped together in the category, and wherein the plurality of item groupings are grouped together by class; and
provide the search results user interface to the client device as a response to the query.

2. The computer system of claim 1, wherein the computer-useable instructions further cause the one or more processors to:
determine a ranking for each class from the plurality of classes; and
order at least a portion of the classes on the search results user interface based on the rankings.

3. The computer system of claim 1, wherein the computer-useable instructions further cause the one or more processors to:
determine a ranking for each category in a first class from the plurality of classes; and
wherein the search results user interface displays at least a portion of the categories in the first class based on the rankings.

4. The computer system of claim 3, wherein a subset of categories in the first class are selected for display on the search results user interface based on the rankings and the subset of categories are ordered on the search results user interface based on the rankings.

5. The computer system of claim 3, wherein the ranking for each category in the first class is based on a category transition score determined for each category of the first class.

6. The computer system of claim 5, wherein the category transition score for a given category is based on item transition scores for items within the given category.

7. The computer system of claim 6, wherein the item transition scores are determined using historical user data regarding past user interactions with the items within the given category.

8. A computer-implemented method comprising:
receiving a query from a client device;
in response to receiving the query, generating a search results user interface for returning to the client device in response to the query by:
querying an item database to identify a plurality of items as search results for the query,
identifying a plurality of categories based on the plurality of items identified as search results for the query,
grouping the plurality of items identified as search results for the query into the plurality of categories, wherein each category comprises a subset of items sharing one or more attributes and each item from the plurality of items is placed in one of the plurality of categories, identifying a plurality of classes based on the plurality of categories identified for the plurality of items identified as search results for the query, grouping the plurality of categories for the plurality of items identified as search results for the query into a plurality of classes, wherein each class comprises a subset of categories sharing one or more attributes and each category from the plurality of categories is placed in one of the plurality of classes, and generating the search results user interface displaying a plurality of item groupings, wherein each item grouping on the search results user interface identifies a category from the plurality of categories and includes one or items grouped together in the category, and wherein the plurality of item groupings are grouped together by class on the search results user interface; and providing the search results user interface to the client device as a response to the query.

9. The computer-implemented method of claim 8, further comprising:

determining a ranking for each class from the plurality of classes; and ordering at least a portion of the classes on the search results user interface based on the rankings.

10. The computer-implemented method of claim 8, further comprising:

determining a ranking for each category in a first class from the plurality of classes; and wherein the search result user interface displays at least a portion of the categories in the first class based on the rankings.

11. The computer-implemented method of claim 10, wherein a subset of categories in the first class are selected for display on the search results user interface based on the rankings and the subset of categories are ordered on the search results user interface based on the rankings.

12. The computer-implemented method of claim 10, wherein the ranking for each category in the first class is based on a category transition score determined for each category of the first class.

13. The computer-implemented method of claim 12, wherein the category transition score for a given category is based on item transition scores for items within the given category.

14. The computer-implemented method of claim 13, wherein the item transition scores are determined using historical user data regarding past user interactions with the items within the given category.

15. One or more machine-storage media storing computer-useable instructions that, when used by one or more computers, cause the one or more computers to perform operations, the operations comprising:

receiving a query from a client device;

in response to receiving the query, generating a search results user interface for returning to the client device in response to the query by:

grouping a plurality of items identified as search results for the query into a plurality of categories, wherein each category comprises a subset of items sharing one or more attributes and each item from the plurality of items is placed in one of the plurality of categories, grouping the plurality of categories for the plurality of items identified as search results for the query into a plurality of classes, wherein each class comprises a subset of categories sharing one or more attributes and each category from the plurality of categories is placed in one of the plurality of classes, and generating the search results user interface displaying a plurality of item groupings, wherein each item grouping identifies a category from the plurality of categories and includes one or items grouped together in the category, and wherein the plurality of item groupings are grouped together by class; and providing the search results user interface to the client device as a response to the query.

16. The one or more machine-storage media of claim 15, wherein the operations further comprise:

determining a ranking for each class from the plurality of classes; and ordering at least a portion of the classes on the search results user interface based on the rankings.

17. The one or more machine-storage media of claim 15, wherein the operations further comprise:

determining a ranking for each category in a first class from the plurality of classes; and wherein the search results user interface displays at least a portion of the categories in the first class based on the rankings.

18. The one or more machine-storage media of claim 17, wherein a subset of categories in the first class are selected for display on the search results user interface based on the rankings and the subset of categories are ordered on the search results user interface based on the rankings.

19. The one or more machine-storage media of claim 17, wherein the ranking for each category in the first class is based on a category transition score determined for each category of the first class.

20. The one or more machine-storage media of claim 19, wherein the category transition score for a given category is based on item transition scores for items within the given category, and wherein the item transition scores are determined using historical user data regarding past user interactions with the items within the given category.

* * * * *